March 10, 1925. 1,529,641
M. HENNEN
AGRICULTURAL IMPLEMENT CARRIER
Filed Aug. 28, 1920 2 Sheets-Sheet 1

Inventor
M. Hennen
by G. F. DeWein
Attorney

March 10, 1925.
M. HENNEN
1,529,641
AGRICULTURAL IMPLEMENT CARRIER
Filed Aug. 28, 1920  2 Sheets-Sheet 2
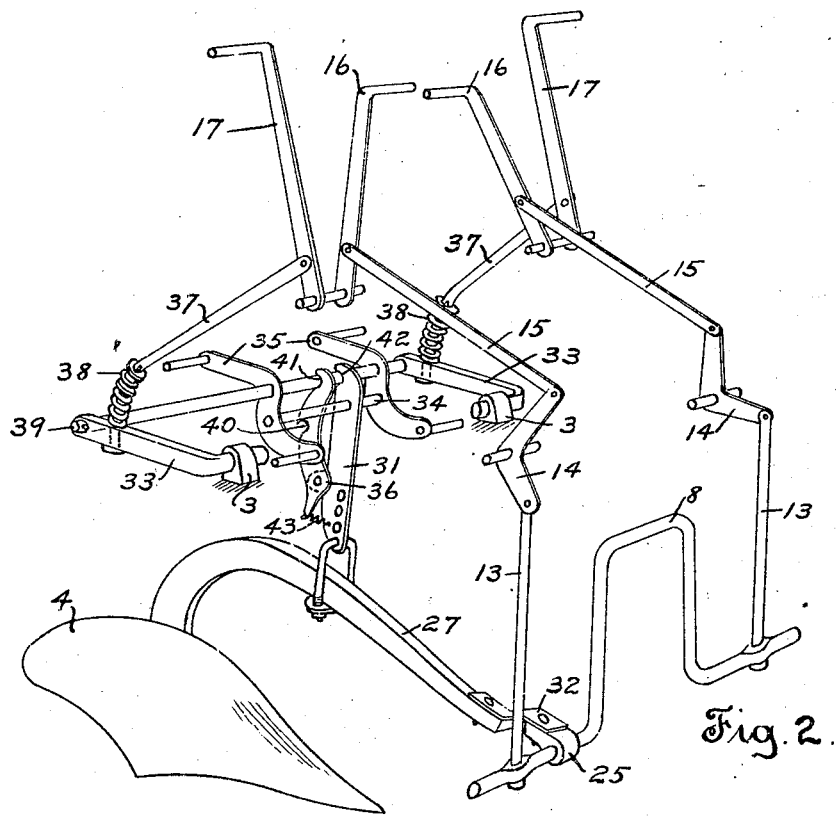
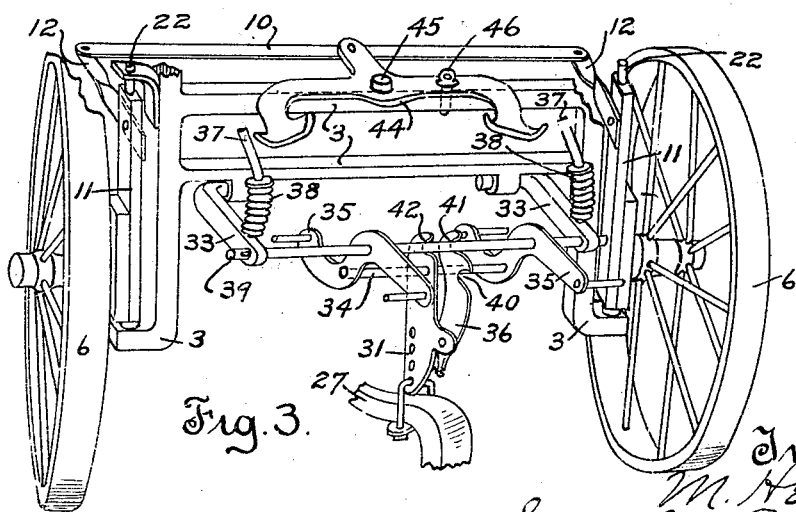

Patented Mar. 10, 1925.

1,529,641

UNITED STATES PATENT OFFICE.

MATH HENNEN, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

AGRICULTURAL-IMPLEMENT CARRIER.

Application filed August 28, 1920. Serial No. 406,525.

*To all whom it may concern:*

Be it known that MATH HENNEN, a citizen of the United States of America, residing at Milwaukee, in the county of Milwaukee and State of Wisconsin, has invented a certain new and useful Improvement in Agricultural-Implement Carriers, of which the following is a specification.

This invention relates in general to improvements in the construction and operation of agricultural implements and to devices for transporting such implements, and relates more specifically to an improved attacher and carrier for agricultural implements such as plows, cultivators, and harrows.

An object of the invention is to provide an implement carriage which is relatively simple and compact in construction and efficient in operation. Another object of the invention is to provide a carrier for agricultural implements such as plows, cultivators, and harrows, which will permit great flexibility in attachment, positioning and adjustment of the implement so as to secure maximum efficiency in operation.

Some of the more specific objects of the invention are as follows: to provide an implement carriage which will permit reduction of the implements to their simplest form: to provide a single carrier adapted for interchangeable attachment to and co-operation with various implements such as mold board plows, side hill plows, middle busters, disk cultivator gangs, shovel cultivator gangs, spring tooth cultivator gangs, stubble shaver gangs, stubble digger gangs, listers and disk harrows: to provide an implement carriage adapted for attachment to and co-operation with a motor driven tractor: to provide an implement carrier operable in conjunction with a tractor by a single attendant: to provide for convenient and rapid lifting, lowering and leveling of the implements drawn by the carriage: to provide a carrier which will permit unobstructed transportation of implements associated therewith over roads and the like: to provide other improvements in implement attachers and carriers which will facilitate manufacture and operation thereof.

A clear conception of an embodiment of the invention may be had by referring to the drawings accompanying and forming part of this specification, in which like reference characters designate the same or similar parts in the various views.

Fig. 2 is a diagrammatic perspective of the control levers and other elements of the implement attacher and carrier, some of the parts having been reduced to their simplest form in order to avoid obscurity in the disclosure.

Fig. 3 is a fragmentary rear perspective of the implement carrier showing the steering and implement lifting and adjusting mechanisms.

Figure 1:
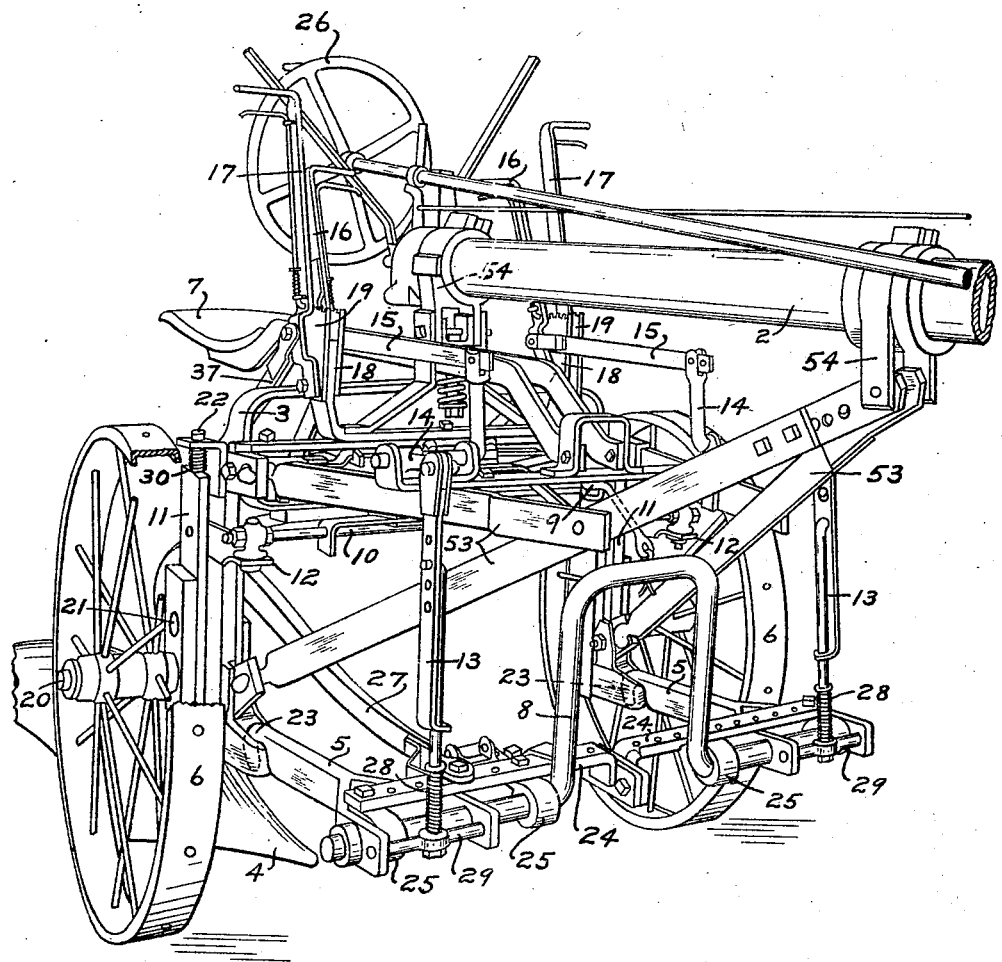
Fig. 1 is a perspective view of the improved implement attacher and carrier showing the same associated with a fragment of a motor driven tractor, and showing a mold board plow attached thereto.

The implement carriage which is adapted for attachment to the reach rod 2 of a standard tractor, comprises generally a main frame 3 provided with draft bars 53 and clamps 54 for connecting the same to the tractor reach rod 2, a pair of laterally spaced wheels 6 vertically pivotally associated with the sides of the frame 3, implement draft mechanism located forwardly relatively to the frame 3 and adapted for attachment to the forward end of an implement such as a plow 4, and implement lifting, lowering and leveling mechanism located rearwardly of the frame 3. The carrier is provided with a seat 7 secured to seat bars which are attached to the frame 3 and to the draft bars 53 in any convenient manner. The seat 7 is located in proximity to the steering wheel 26 and to the levers for manipulating and controlling the tractor, which in the present instance, are mounted upon the reach rod 2.

The wheels 6 are mounted upon horizontal stub axles 20 which are secured to wheel standards 11 having upper and lower vertical pivots 22 which are associated with bearings in the sides of the frame 3. The stub axles 20 may be adjusted vertically along the standards 11 such adjustments being permitted by holes 21 in the standards 11. The standards 11 may be provided with springs 30 between the frame 3 and the upper ends of the standards, for the purpose of absorbing abnormal shocks to which wheels 6 may be subjected. Each of the standards 11 is provided with a forwardly extending pivot arm 12, see Figs. 1 and 3, to the outer extremities of which a pivot arm connection 10 is pivotally secured. The medial portion of the connection 10 is pivotally secured to the forwardly extending arm of the foot control plate 44 which is pivotally secured to the frame 3 by means of a pivot 45 located substantially in line with the standards 11. The foot control plate 44 is provided with a pair of sockets shaped to accommodate the feet of an operator and located in proximity to the seat 7. The plate 44 may be locked against movement about the pivot 45 by means of a locking pin 46 passing through openings in the plate 44 and in the frame 3. This locking device may also assume the form of a spring latch which will automatically snap into locked position as the plate 44 assumes a predetermined position.

The implement tilting mechanism comprises a pair of forwardly extending push bars 5 having hooked pivots 23 which engage recesses provided in the lower front portion of the main frame 3. These push bars 5 have their forward ends bifurcated, the bifurcations being connected by means of cross shafts 29. Passing through openings in the cross shafts 29 and extending vertically therefrom, are elongatable tilting links 13, the upper extremities of which are pivotally connected to the horizontal arms of the cranks 14 which are supported upon the main frame. The vertical arms of the cranks 14 are connected with tilting levers 16 by means of connections 15. The levers 16 are pivotally associated with the frame 3 and carry latches which function to adjustably lock the levers 16 relatively to the tilting lever sectors 18 which are also associated with the main frame 3. Springs 28 associated with the lower ends of the links 13 permit the bars 5 and the elements associated therewith, to move upwardly a limited amount, without disturbing the position of the levers 16, thereby relieving the lever locks from undue stresses. The push bars 5 have their outer ends connected by means of a transverse arch rod 8 provided with an upwardly extending U, the uppermost portion of which is loosely connected to the carrier frame by means of a hanger 9. Pivotally mounted upon the arch rod 8 is a series of draw bar hinges 25 to the swinging ends of which the transverse draw bars 24 are adjustably attached. There are two draw bars 24 which are normally connected within the U of the rod 8, but which may be disconnected and spread apart when cultivating or otherwise treating vegetation which is taller than the vertical distance between the draw bars 24 and the ground. The implement disclosed in the present instance as being a mold board plow 4, is provided with a forwardly extending draft beam 27, which is adjustably attached to one or more of the hinges 25 by means of bent hitch connecting links 32 and suitable brackets.

The rear portion of the beam 27 of the implement is connected to the lower extremity of one or more lifting links 31 which are hung upon a lifting rod 34 supported in laterally spaced foot lift frames 35. The foot lift frames 35 are provided with lateral projections for accommodating the feet of an operator, and are loosely pivotally supported upon a rear cross shaft 39 which is in turn supported in the ends of the lifting shaft supports 33 which are pivotally connected to the main frame 3. Each lifting link 31 is provided with a projection to which is pivotally secured a locking bar 36 having a locking recess 40 and a holding recess 41 therein. The lifting link 31 is also provided with a holding recess 42, the recesses 41, 42 being formed for engagement with the shaft 39 when the plow or other implement is in operating position. The locking bar 36 has a downwardly extending projection which is connected with the side of the adjacent link 31 by means of a spring 43 which urges the bar 36 toward the shaft 39. Each of the supports 33 is connected with a lifting lever 17 by means of a pressure rod 37 which passes through an opening in the corresponding support 33 and is provided with a collar located some distance above the corresponding support 33. Compression springs 38 react against these collars and against the adjacent supports 33, thereby permitting limited vertical movement of the supports 33 and of the elements associated therewith, without disturbing the position of the rods 37. The levers 17 are provided with latches adapted for engagement with notches in the sectors 19 secured to the frame 3.

During normal operation, the implement carriage is preferably attached to a tractor in such manner as to permit ready manipulation of the tractor controlling levers and of the steering wheel 26, from the operator's seat 7. The plow 4 or other implement which is to be drawn, has a forward portion of its draft beam 27 secured to a draw bar 24, and has a rear portion of the beam 27 secured to the lower end of a lifting link 31. As the tractor advances, the implement carriage simultaneously advances dragging the implement with it.

As efficient operation of most implements is dependent upon accurate application of the pulling force and upon proper positioning of the implement relatively to the ground, it is desirable to adjust the position of the transverse draw bars 24 so as to properly apply the draft and to level the implement. Such adjustment of the draw bars 24 may be effected by manipulation and adjustment of the tilting levers 16 relatively to the fixed notched sectors 18. By releasing the lock of either of the levers 16, and moving the released lever forward or backward, the corresponding pivoted push arm 5 will be swung about its pivot 23 thereby lowering or raising the adjacent end of the rear transverse draw bars 24 and tilting the bars. By simultaneously manipulating both of the tilting levers 16, the draw bars 24 may be moved up or down to parallel positions. The elevation and transverse angularity of the draw bars 24 may thus be varied within the limits of the notches in the sectors 18, to accommodate one or more implements attached to the draw bars and to produce efficient application of the pulling force. The hook pivots 23 have sufficient lateral clearance to permit tilting of the arms 5 during tilting of the draw bars 24 and the looseness between other connected elements is also sufficient to permit such tilting without injuring the parts. If the degree of swing of the arms 5 as limited by the notched sectors 18, is insufficient to permit proper disposition of the implement draft beam 27, the links 13 may be adjusted in length or the hitch bars 32 may be turned up side down, in order to increase the range of adjustment. The compression springs 28 protect the levers 16 and the elements associated therewith, against injury due to sudden or extreme application of upward pressures against the draw bars 24, these springs being automatically compressed by such pressures without displacing the links 13.

The rear portion of the implement may be properly positioned relatively to the ground, by manipulation of the lifting levers 17 and of the foot lift frames 35. By releasing the lock of either of the levers 17, and moving the released lever forward or backward, the corresponding pivoted support 33 will be swung about its pivot on the frame 3, thereby raising or lowering the adjacent end of the transverse cross shaft 39 and tilting this shaft. By simultaneously manipulating both lifting levers 17, the cross shaft 39 may be moved up or down to parallel positions. The connections between the ends of the shaft 39 and the supports 33, are such as will permit relative tilting, without injuring the parts. The elevation and transverse angular position of the cross shaft 39 may thus be varied within the limits of the notches in the sectors 19 to properly position one or more implements associated with the shaft, relatively to the ground. The compression springs 38 protect the levers 17 and the elements associated directly therewith, against injury due to sudden or extreme upward pressures acting upon the shaft 39, and also permit application of a predetermined downward pressure upon the implement when coacting with the ground.

As the foot lift mechanism is pivotally suspended from the cross shaft 39, the rear portion of the implement may be raised and lowered relatively to the ground, independently of the adjustment afforded by the levers 17. As shown in Figs. 2 and 3, the plow 4 is in operating position with a rear portion of its draft beam 27 suspended from the lifting rod 34 by means of the lifting link 31. In order to raise the plow share away from the ground, it is necessary to swing the frames 35 in an anti-clockwise direction as viewed in Fig 2, until the recess 40 of the locking bar 36 engages the cross shaft 39. The plow 4 will then be held above the ground until the bar 36 is pushed away from the shaft 39 thus releasing the lock afforded by the recess 40 and permitting the plow and the lifting mechanism to drop to the position shown. With the implement in operating position, the recesses 41, 42 of the bars 36 and link 31 respectively, engage the cross shaft 39 and the rod 34 is below the shaft 39 and engages the rear of the bar 36, thereby providing a thrust bearing for the rear implement connection. A vertical series of openings in the lifting link 31 permits additional vertical adjustment of the implement relatively to the frame 3, beyond that afforded by the notched sectors 19.

It will thus be noted, that the position and elevation of the implement may be quickly and readily varied by manipulation of levers which are within easy reach of an operator stationed upon the seat 7. These adjustments will permit attachment and efficient operation of numerous implements and also permit removal of practically all parts of the implement except the draft beam and the portion coacting with the ground. The implements may be readily interchanged and the entire unit is operable by a single attendant. The implements associated with the carriage may be quickly elevated to permit free transportation over the ground and are effectively held in elevated position by the locking bars 36. While but one implement has been shown attached to the carriage, it is obvious that two or three implements may be simultaneously attached and that independent foot lifts may be provided for each implement, such disclosure having been omitted in order to avoid confusion.

As the wheels 6 are located remote from the tractor wheels and adjacent to the implement it is desirable to have them swingable about vertical axes in order to assist in transporting the vehicle about short curves. With the locking pin 46 removed, the wheels 6 may be readily swung about the pivots 22 of the standards 11, by moving the plate 44 about the pivot 45. Such movement of the plate 44 may be readily accomplished by an operator located on the seat 7. The wheels 6 may also be alined by adjustment of the length of the connection 10.

It is also desirable at times to provide clearance sufficient to permit the carriage to pass over vegetation such as corn, which is higher than the vertical distance below the draw bars 24 and the rod 8. When such is the case, the draw bars 24 may be disconnected and adjusted endwise to provide a free space within the U of the rod 8. It is preferable however, when plowing and utilizing other implements in which clearance space is not essential, to connect the draw bars 24 within the U of the rod 8, thus providing a more rigid draft element.

It is also desirable when plowing, to have the axis of the wheel 6 on the land side of the carriage located above the furrow side wheel by approximately the depth of the furrow. Such adjustment of the wheel axle 20 is permitted by the holes 21 in the wheel standards 11.

It should be understood that it is not desired to limit the invention to the exact details of construction and operation herein shown and described, for various modifications within the scope of the appended claims may occur to persons skilled in the art.

It is claimed and desired to secure by Letters Patent:

1. In combination, a carrier frame, a lifting rod extending transversely across said frame, said rod being swingable about a horizontal pivotal axis, an adjusting rod supported to swing about the axis of said lifting rod, means for suspending an implement directly from said adjusting rod, and an element carried by said suspension means and cooperable with said lifting rod to lock said adjusting rod in desired position.

2. In combination, a carrier frame, a lifting rod extending transversely across the rear of said frame, said rod being swingable about a horizontal pivotal axis, an adjusting rod supported to swing about the axis of said lifting rod, means including an upright bar for suspending an implement directly from said adjusting rod, and an element carried by said bar and cooperable with said lifting rod to lock said adjusting rod in desired position.

3. In combination, a carrier frame, a lifting rod extending transversely across the rear of said frame, said rod being swingable about a horizontal pivotal axis located laterally thereof, an adjusting rod pivotally supported by said lifting rod, means including an upright bar for suspending an implement directly from said adjusting rod, and a latch pivotally associated with said bar and cooperable with said lifting rod to lock said adjusting rod in desired position.

4. In combination, a carrier frame, supporting wheels located on opposite sides of said frame, a lifting rod extending transversely across the rear of said frame between said wheels, said rod being swingable about a horizontal pivotal axis located forwardly thereof, an adjusting rod pivotally supported by said lifting rod, said adjusting rod being movable above and below the horizontal plane of said lifting rod, means including an upright bar for suspending an implement directly from said adjusting rod, and a latch pivotally connected to a medial portion of said bar and cooperable with said lifting rod to lock said adjusting rod in position either above or below the horizontal plane of said lifting rod.

5. In combination, a carrier frame, a lifting rod extending transversely across said frame, hand operable means for swinging said lifting rod about a horizontal pivotal axis, an adjusting rod pivotally supported by said lifting rod, foot operable means for swinging said adjusting rod about the axis of said lifting rod, means for suspending an implement directly from said adjusting rod, and an element carried by said suspension means and cooperable with said lifting rod to lock said adjusting rod in desired position.

6. In combination, a carrier frame, a pair of laterally spaced arms pivotally associated with said frame and extending forwardly therefrom, a bar connecting said arms and adapted for attachment to a forward portion of an implement, means for independently raising and lowering said arms whereby said bar may be either moved to parallel positions or tilted transversely of said frame, a pair of arms pivotally associated with said frame and extending rearwardly therefrom, a lifting rod connecting said rearwardly extending arms and adapted for attachment of a rear portion of the implement, and means for independently raising and lowering said rearwardly extending arms whereby said rod may be either moved to parallel positions or tilted transversely of said frame.

In testimony whereof, the signature of the inventor is affixed hereto:

MATH HENNEN.